(12) United States Patent
Lereboullet et al.

(10) Patent No.: US 8,105,557 B2
(45) Date of Patent: *Jan. 31, 2012

(54) MICROREACTOR ASSEMBLY INCORPORATING INTERCONNECT BACKBONE AND DIVERSE FLUIDIC MICROSTRUCTURES

(75) Inventors: Jean-Pierre Henri Rene Lereboullet, Bois le Roi (FR); Olivier Lobet, Mennecy (FR); Yann P M Nedelec, Avon (FR); Ronan Tanguy, Grez sur Loing (FR)

(73) Assignee: Corning Incorporated, Corning, NY (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/361,264

(22) Filed: Jan. 28, 2009

(65) Prior Publication Data

US 2009/0191102 A1  Jul. 30, 2009

(30) Foreign Application Priority Data

Jan. 30, 2008 (EP) .................................. 08305011

(51) Int. Cl.
*B01J 8/00* (2006.01)
*B01J 19/00* (2006.01)
*B28B 1/00* (2006.01)

(52) U.S. Cl. ........ 422/603; 422/502; 422/187; 422/130; 422/240; 264/605; 264/607

(58) Field of Classification Search .................. 422/603, 422/502, 187, 198, 130, 240; 264/605, 607
See application file for complete search history.

(56) References Cited

U.S. PATENT DOCUMENTS

| 2005/0042149 A1 | 2/2005 | Bard ............................. 422/130 |
| 2006/0051248 A1 | 3/2006 | Chou et al. .................... 422/100 |

FOREIGN PATENT DOCUMENTS

| EP | 1415707 A1 | 5/2004 |
| EP | 2072115 A1 | 6/2009 |
| WO | WO00/62919 | 10/2000 |
| WO | WO2004/034028 | 4/2004 |
| WO | WO2007/065095 | 6/2007 |
| WO | WO2007/131988 A1 | 11/2007 |

*Primary Examiner* — Walter D Griffin
*Assistant Examiner* — Lessanework Seifu
(74) *Attorney, Agent, or Firm* — Gregory V. Bean

(57) ABSTRACT

A microreactor assembly [100] is provided comprising a fluidic interconnect backbone [10] and plurality of fluidic microstructures. Interconnect input/output ports [12] of the fluidic interconnect backbone [10] are interfaced with microchannel input/output ports [14] of the fluidic microstructures at a plurality of non-polymeric interconnect seals [50]. Interconnect microchannels [15] are defined entirely by the fluidic interconnect backbone [10] and extend between the non-polymeric interconnect seals [50] without interruption by additional sealed interfaces. At least one of the fluidic microstructures [20, 30, 40] may comprise a mixing microstructure formed by a molding process. Another of the fluidic microstructures [20, 30, 40] may comprise an extruded reactor body. Still another fluidic microstructure [20, 30, 40] may comprise a quench-flow or hydrolysis microreactor formed by a hot-pressing method.

13 Claims, 5 Drawing Sheets

MICROREACTOR ASSEMBLY INCORPORATING INTERCONNECT BACKBONE AND DIVERSE FLUIDIC MICROSTRUCTURES

PRIORITY

This application claims priority to European Patent Application number 08305011.2, filed Jan. 30, 2008, titled "Microreactor Assembly Incorporating Interconnect Backbone and Diverse Fluidic Microstructures".

BACKGROUND

The present invention relates to microreactor technology. Microreactors are commonly referred to as microstructured reactors, microchannel reactors, or microfluidic devices. Regardless of the particular nomenclature utilized, the microreactor is a device in which a moving or static target sample is confined and subject to processing. In some cases, the processing involves the analysis of chemical reactions. In others, the processing is executed as part of a manufacturing process utilizing two distinct reactants. In still others, a moving or static target sample is confined in a microreactor as heat is exchanged between the sample and an associated heat exchange fluid. In any case, the dimensions of the confined spaces are generally on the order of about 1 mm. Microchannels are the most typical form of such confinement and the microreactor is usually a continuous flow reactor, as opposed to a batch reactor. The reduced internal dimensions of the microchannels provide considerable improvement in mass and heat transfer rates. In addition, microreactors offer many advantages over conventional scale reactors, including vast improvements in energy efficiency, reaction speed, reaction yield, safety, reliability, scalability, etc.

Microreactors often comprise plural distinct fluidic microstructures that are in fluid communication with each other and are configured to execute different functions in the microreactor. For example, and not by way of limitation, an initial microstructure may be configured to mix two reactants. Subsequent microstructures may be configured for heat exchange, quenching, hydrolysis, etc, or simply to provide a controlled residence time for the mixed reactants. The various distinct microstructures must often be placed in serial or parallel fluid communication with each other. In many cases, the associated components for directing the reactants to the proper microchannels within the network can be fairly complex. Further, the components need to be configured for operation under high temperatures and pressures. As a result, microreactor configurations such as that disclosed in published international patent application WO-2007-036513 employ a variety of fluidic ducts, fittings, adapters, O-rings, screws, clamps, and other types of connection elements to interconnect various microstructures within the microreactor configuration. Each individual elements increases the complexity of the system and is a potential source of leakage or other error within the system. The present invention relates generally to the design of a microreactor assembly that reduces the use of many of the aforementioned connection elements and provides a common fluid communication platform upon which a variety of distinct microreactor structures can be supported and placed in fluid communication with each other.

According to one embodiment of the present invention, a microreactor assembly is provided comprising a fluidic interconnect backbone and plurality of fluidic microstructures. Interconnect input/output ports of the fluidic interconnect backbone are interfaced with microchannel input/output ports of the fluidic microstructures at a plurality of non-polymeric interconnect seals. Interconnect microchannels are defined entirely by the fluidic interconnect backbone and extend between the non-polymeric interconnect seals without interruption by additional sealed interfaces. At least one of the fluidic microstructures may comprise a mixing microstructure formed by a molding process. Another of the fluidic microstructures may comprise an extruded reactor body. Still another fluidic microstructure may comprise a quench-flow or hydrolysis microreactor formed by a hot-pressing method.

BRIEF DESCRIPTION OF THE FIGURES

The following detailed description of specific embodiments of the present invention can be best understood when read in conjunction with the following drawings, where like structure is indicated with like reference numerals and in which:

FIGS. 1A and 1B illustrate alternative configurations of portions of the microreactor assembly including non-polymeric interconnect seals;

DETAILED DESCRIPTION

Figure 1:
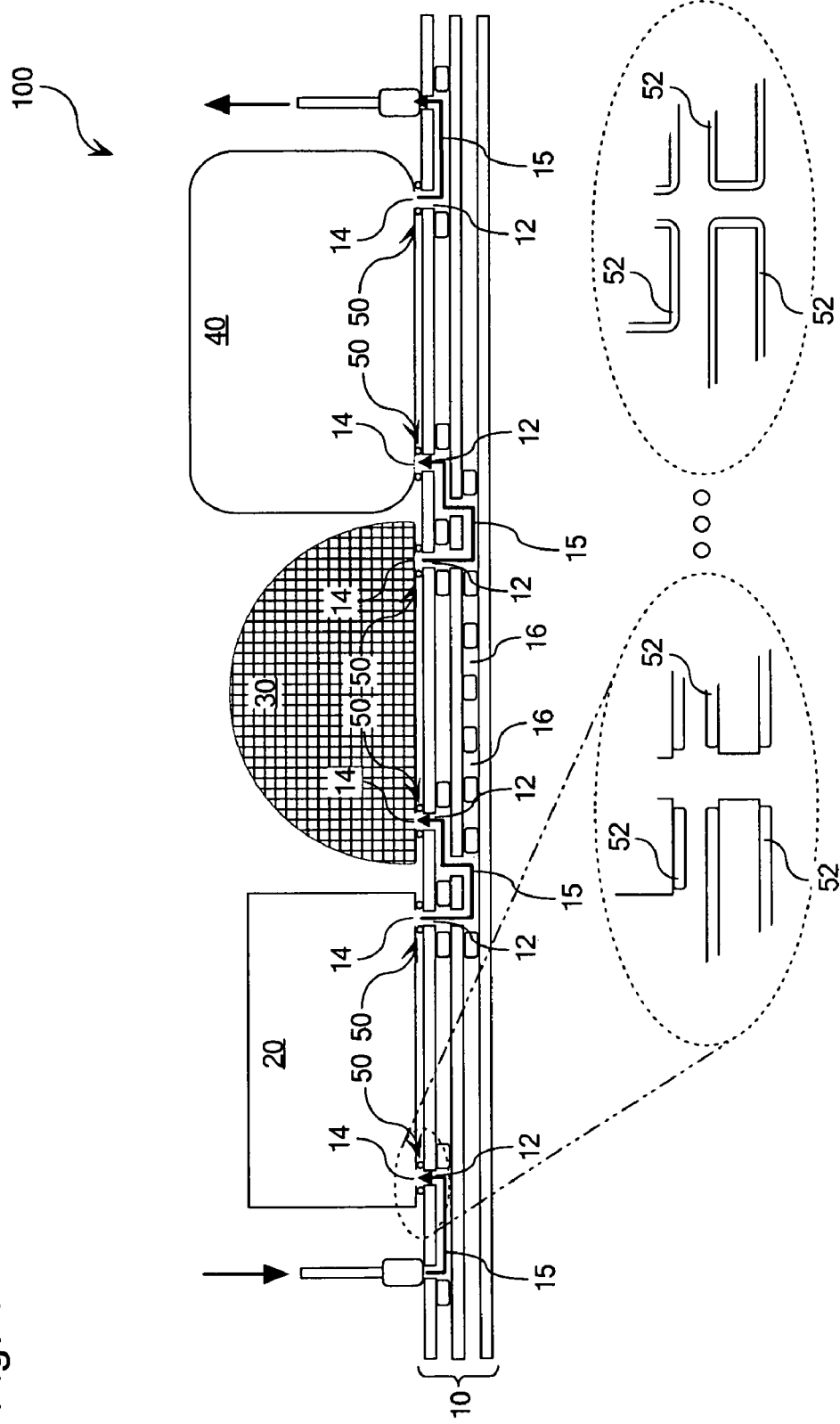
FIG. 1 is a schematic illustration of a microreactor assembly according to one embodiment of the present invention.

Referring to FIG. 1, a microreactor assembly 100 according to one embodiment of the present invention is illustrated. Generally, the microreactor assembly 100 comprises a fluidic interconnect backbone 10 and plurality of fluidic microstructures 20, 30, 40. The fluidic interconnect backbone 10 comprises a number of interconnect microchannels 15, each of which comprises interconnect input/output ports 12. Similarly, each of the fluidic microstructures 20, 30, 40 comprises a plurality of fluidic microchannels and respective microchannel input/output ports 14.

Although the present invention is not limited to the use of a specific microreactor configuration or the use of specific microstructures, in the illustrated embodiment, the first microstructure 20 can be configured to mix two reactants and to provide for heat exchange between the reactants and a thermal fluid. To these ends, it is noted that first microstructure 20 will typically comprise fluidic microchannels that are configured to distribute the reactants across a plurality of reactant flow paths. Each of these reactant flow paths would then be subsequently directed to a mixing zone within the first microstructure 20 where the reactants mix and react. In addition, the first microstructure 20 may also comprise thermal fluid microchannels configured for thermal exchange between a reactant fluid in the fluidic microchannels and a thermal fluid in the thermal fluid microchannels. Alternatively, the first microstructure 20 may merely be configured as a single function microstructure, i.e., as a fluid distribution microstructure, a thermal exchange microstructure, or a reactant mixing microstructure. The specific design of the fluidic microstructure for any combination of these functions can be gleaned from a variety of teachings in the art, including those present in Corning Incorporated European Patent Applications EP 1 679 115 A1, EP 1 854 536 A1, EP 1 604 733 A1, EP 1 720 650 A0, and other similarly classified European patents and patent applications.

Figure 7:
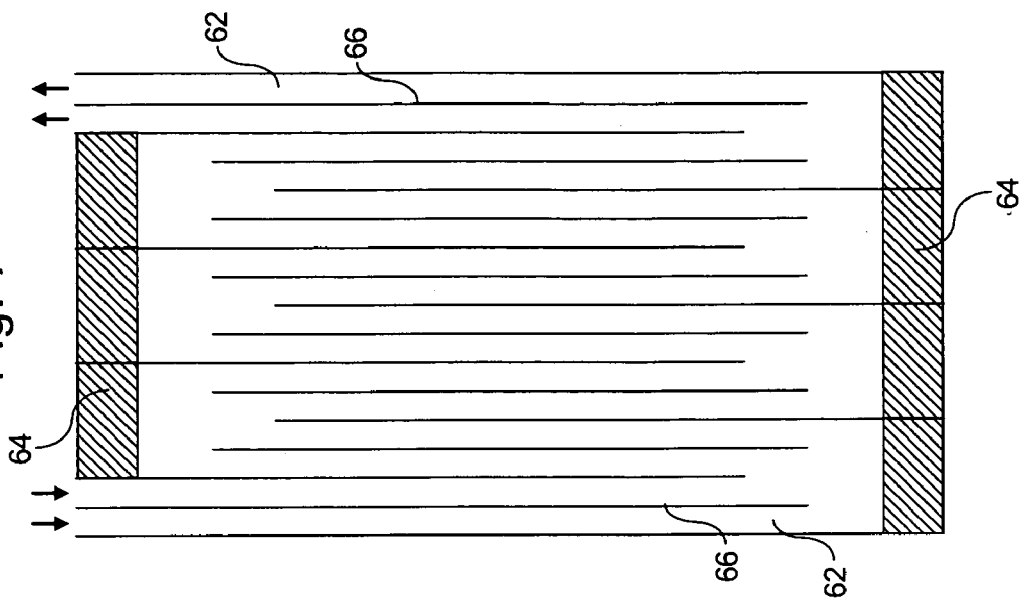
FIGS. 5-7 illustrate particular aspects of minireactor structures suitable for use in microreactor assemblies according to the present invention.
Figure 6:
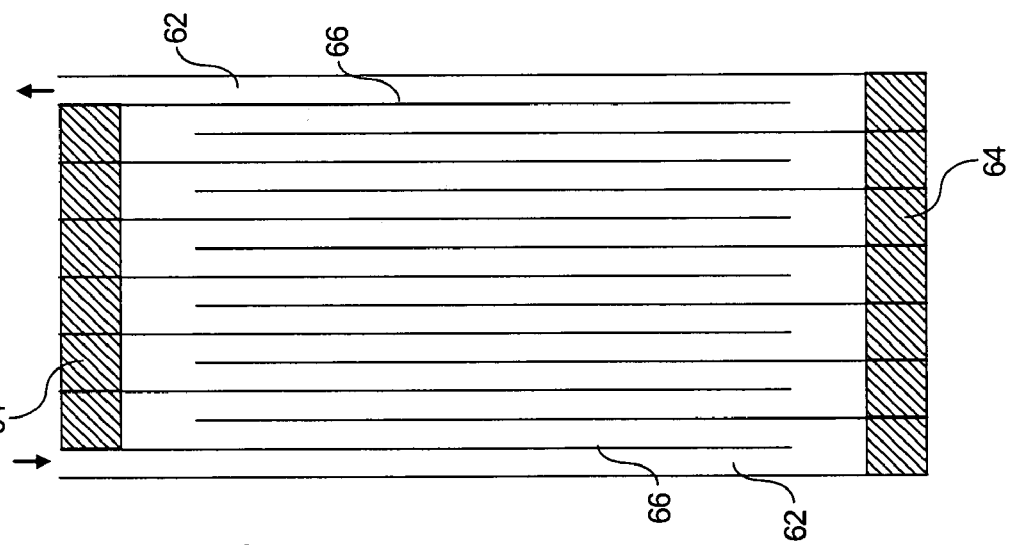
Figure 5:
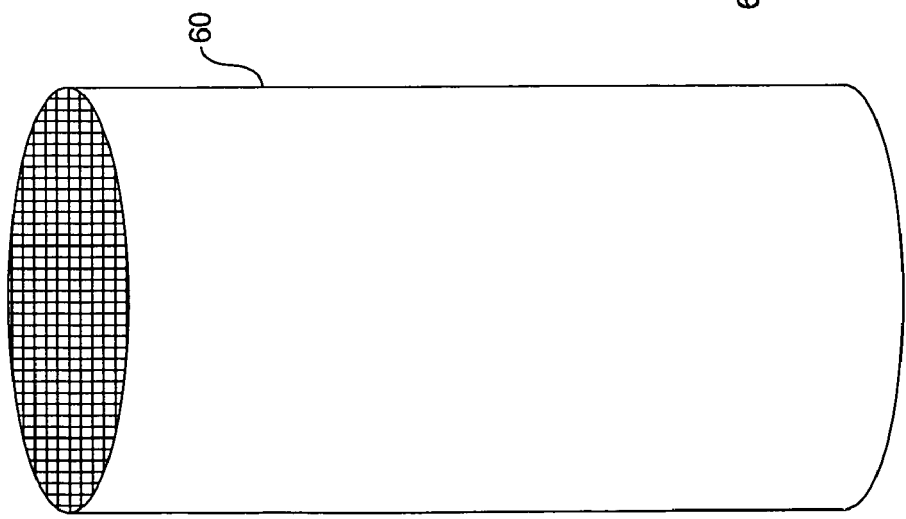

The second microstructure 30 is illustrated downstream of the first microstructure 20 and, in the illustrated embodiment, is configured primarily as a minireactor configured to provide a large volume of microchannels extending the residence time of the reactants therein. Alternatively, or additionally, the second microstructure 30 may be configured to execute various combinations of the functions described with reference to the first microstructure 20, i.e., fluid distribution, thermal exchange, reactant mixing. Referring to FIGS. 5-7, it is contemplated that the minireactor 30 can be fabricated as an extruded honeycomb structure 60, with particular longitudinal passages 62 of the honeycomb structure 60 designated for the passage of thermal fluids and reactants, respectively. As is illustrated in FIGS. 6 and 7, residence time within the honeycomb structure can be enhanced by capping selected ends 64 of the longitudinal honeycomb passages 62 and removing portions of the honeycomb walls 66 to place adjacent passages 62 in communication with each other near the capped ends 64 and define a circuitous flow path in the honeycomb structure 60. The flow paths illustrated in FIGS. 6 and 7 are presented for illustrative purposes only and, as will be appreciated by those practicing the present invention, a variety of more complex or less complex flow paths may be constructed by selecting particular passages for capping and wall removal.

The third microstructure 40 is illustrated downstream of the first and second microstructures in FIG. 1 and, in the illustrated embodiment, is configured primarily as a relatively large channel microreactor that is typically used for operations where low pressure drop and low resistance to flow are important, as would be the case for multichannel quench-flow or hydrolysis microreactors.

Typically, the microstructures 20, 30, 40 will be formed by two or more distinct manufacturing methods, particularly when the respective microstructures are configured to execute different functions, or different combinations of functions. For example, if the first microstructure 20 is primarily configured for reactant mixing, it may be formed by various flat molding processes, if the second microstructure 30 is configured as a minireactor, it can be formed through extrusion processes, and, if the third microstructure 40 is configured as a quench-flow or hydrolysis microreactor, it may be formed by hot-pressing methods, all of which are documented in the above-referenced applications. Given this potentially diverse constituency, the various fluidic interconnect backbones 10 illustrated herein allow those practicing the present invention to construct common backbone microreactor assemblies using fluidic microstructures that have been manufactured under a variety of different protocols that would not otherwise be amenable to assembly on a common interconnect backbone.

To this end, the microreactor assembly 100 is provided with a plurality of non-polymeric interconnect seals 50 associated with the interconnect input/output ports 12. More specifically, the interconnect input/output ports 12 of the fluidic interconnect backbone 10 are interfaced with microchannel input/output ports 14 of the fluidic microstructures 20, 30, 40 at one of the non-polymeric interconnect seals 50. The non-polymeric interconnect seals 50 can be formed in a variety of ways. In one embodiment, the non-polymeric interconnect seals 50 are formed as adjoining sintered glass portions of the fluidic interconnect backbone 10 and the fluidic microstructures 20, 30, 40. Alternatively, referring to FIGS. 1A and 1B, the non-polymeric interconnect seals 50 may be formed by providing discrete or continuous layers 52 of sintered glass particles interposed between adjacent glass portions of the fluidic interconnect backbone 10 and the fluidic microstructures 20, 30, 40.

Where a discrete or continuous layer of sintered glass particles are utilized to form the non-polymeric interconnect seals 50, it may be advantageous to provide sintered glass particles that exhibit a coefficient of thermal elongation that is compatible with the coefficient of thermal elongation of the adjacent glass portions of the fluidic interconnect backbone 10 and the fluidic microstructures 20, 30, 40. It may also be preferable to provide the layer of sintered glass particles as a paste comprising the sintered glass particles and a binder, such as paraffin. In further alternative embodiments, the non-polymeric interconnect seals 50 comprise a sealed interface formed jointly by a glass or ceramic portion of one of the fluidic microstructures, a glass or ceramic portion of the fluidic interconnect backbone, and an intervening non-polymeric bonding material. In any case, the interconnect seals 50 are selected to be non-polymeric for improved performance at relatively high or relatively low operating temperatures, i.e., temperatures at which polymeric seals would fail or degrade.

The interconnect microchannels 15 are defined entirely by the fluidic interconnect backbone and extend between the non-polymeric interconnect seals 50 without interruption by, for example, additional sealed interfaces that would otherwise be presented if tubing, connectors, valves or other fluid handling hardware were used to couple the fluidic microstructures 20, 30, 40. As illustrated in FIG. 1, each interconnect input/output port 12 of the fluidic interconnect backbone 10 is interfaced with a corresponding microchannel input/output port 14 of one of the fluidic microstructures 20, 30, 40 at one of the non-polymeric interconnect seals 50. As a result, the microreactor assembly 100 utilizes the interconnect backbone 10 to provide a high performance connection between the fluidic microstructures 20, 30, 40—in terms of chemical resistance and operating pressure and temperature. The interconnect backbone 10 also simplifies the microreactor assembly 100 by significantly decreasing the number of external connections between microstructures and the associated securing and sealing hardware.

Further, the interconnect backbone 10 can improve process control in microreactor assemblies because it can also be configured to incorporate thermal interconnect microchannels 16. More specifically, referring collectively to FIGS. 1, 3, and 4, if any of the fluidic microstructures 20, 30, 40 were to include thermal fluid microchannels configured for thermal exchange between a reactant fluid and a thermal fluid moving through adjacent microchannels of the microstructure, the thermal interconnect microchannels 16 can be placed in fluid communication with the thermal fluid microchannels of the fluidic microstructures 20, 30, 40 via additional non-polymeric interconnect seals 50.

As is illustrated in FIG. 1, the fluidic interconnect backbone 10 can be configured as a multilayer manifold comprising a network of cross-layer openings and intra-layer blockages configured to segregate individual layers of the multilayer manifold into a plurality of independent interconnect microchannels. As a result, the fluidic interconnect backbone 10 can be configured to complement a variety of fluidic microstructures of varying complexity. The respective positions of the cross-layer openings can be selected such that the interconnect input and output ports 12 complement standard I/O patterns of a variety of microfluidic structures or customized I/O patterns for highly specialized applications. In addition, by constructing the interconnect backbone 10 of glass, ceramic, or composite materials that are amenable to modification, the respective size, positions, and shape of the cross layer openings can be customized to match a variety of technical applications.

As is noted above, the fluidic microstructures 20, 30, 40 may define a set of diverse fluidic microstructures representing a plurality of different manufacturing processes including, for example, injection molding, flat molding, hot pressing, extrusion, etc. In this context, the non-polymeric interconnect seals 50 are able to interface the interconnect input/output ports 12 with corresponding microchannel input/output ports 14 of the diverse fluidic microstructures 20, 30, 40, even though the respective interconnect input/output ports 12 are substantially identical, i.e., they are formed from the same interconnect backbone 10—a non-diverse structure. As a result, in practicing the present invention, the interconnect backbone 10 may be utilized to form non-polymeric interconnect seals with fluidic microstructures 20, 30, 40 that define a variety of different structural configurations and microreactor functions including, but not limited to, fluid distribution, thermal exchange, reactant mixing, quench-flow, hydrolysis, residence time, and combinations thereof.

To manufacture microreactor assemblies 100 according to the present invention, particularly those where the fluidic microstructures represent a plurality of different manufacturing processes, it will often be possible to tailor the fabrication scheme so that each of the plurality of different manufacturing processes comprise a common sintering step. In this case, the non-polymeric interconnect seals can be formed upon execution of the common sintering step. More specifically, given a microreactor assembly 100 comprising a fluidic interconnect backbone 10 and plurality of different fluidic microstructures 20, 30, 40, the fluidic interconnect backbone 10 can first be aligned with the fluidic microstructures 20, 30, 40 by aligning the microchannel input/output ports 14 with suitably located interconnect input/output ports 12. Once aligned, the entire assembly 100 is sintered in the aligned state to form the non-polymeric interconnect seals 50 and to complete fabrication of the un-sintered or "green" portions of the various fluidic microstructures 20, 30, 40.

Figure 4:
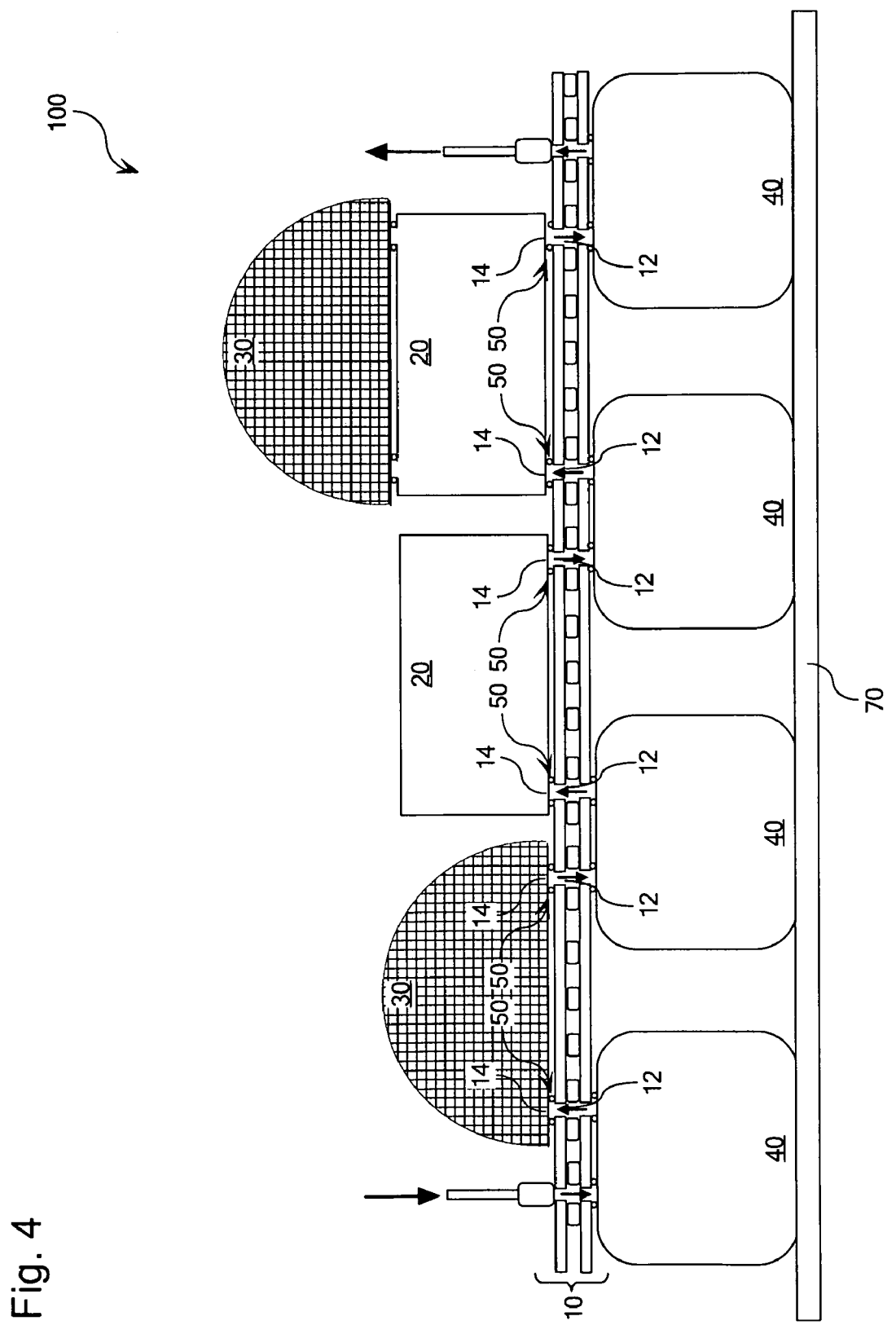

Referring to FIG. 4, to facilitate the aforementioned universal sintering, the fluidic interconnect backbone 10 and the fluidic microstructures 20, 30, 40 can be configured such that selected microstructures define a support plane along which the microstructures and backbone can be supported. For example, in FIG. 4, a set of fluidic microstructures 40 are positioned on the lower face of the interconnect backbone 10 to define the support plane. The remaining fluidic microstructures 20, 30 are positioned on the upper face of the interconnect backbone 10. Given this configuration, and configurations similar to it, the interconnect backbone 10 and the fluidic microstructures 20, 30, 40 can be supported by a sintering support plate 70 in a state of assembly where components of the fluidic microstructures are in an un-sintered green state and, as positioned, can be subject to the aforementioned sintering step.

Figure 2:
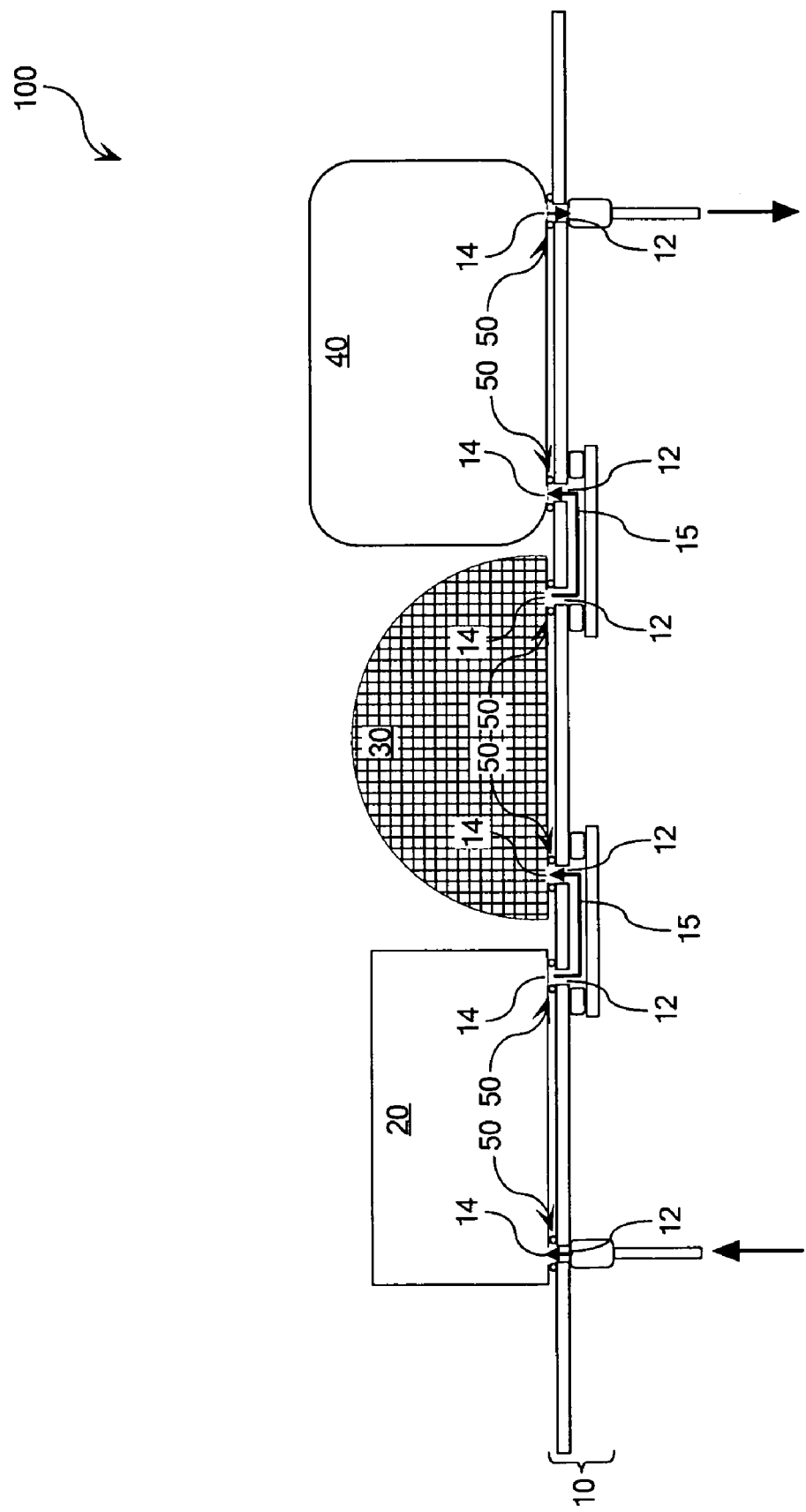
FIGS. 2-4 are schematic illustrations of microreactor assemblies according to additional embodiments of the present invention.
Figure 3:
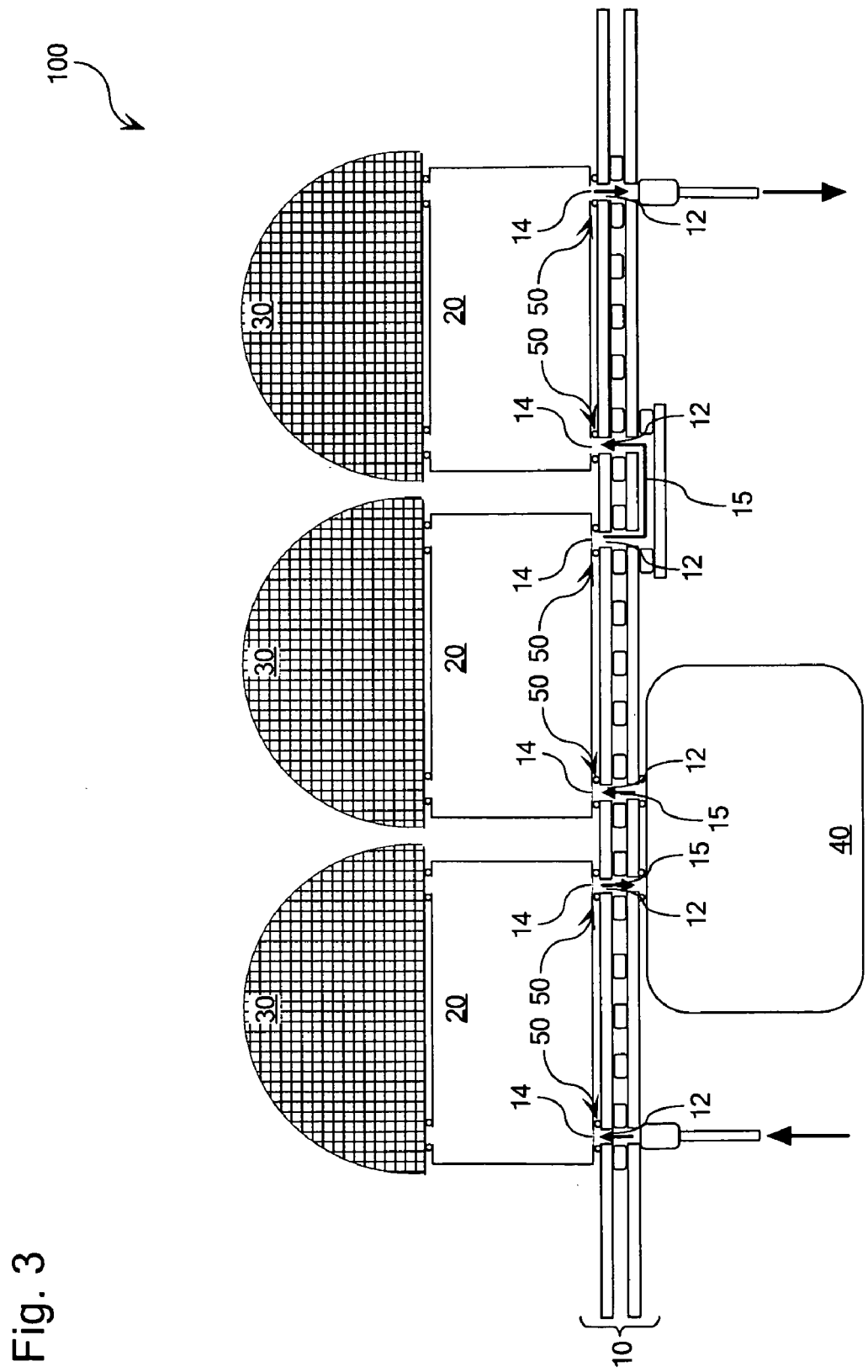

As will be appreciated by those familiar with microreactor technology, the complexity of the reactant and thermal exchange microchannels illustrated herein can vary widely and has merely been illustrated in relatively simple schematic form. For example, a relatively simple microreactor assembly 100 according to the present invention is illustrated in FIG. 2, while more complex assemblies 100 are illustrated in FIGS. 3 and 4. In FIG. 3, relatively large channel microreactor 40 is used interconnect a pair of mixing microstructures 20 and respective minireactors 30 are stacked on corresponding mixing microstructures.

It is noted that recitations herein of a component of the present invention being "configured" in a particular way, to embody a particular property, or function in a particular manner, are structural recitations as opposed to recitations of intended use. More specifically, the references herein to the manner in which a component is "configured" denote an existing physical condition of the component and, as such, are to be taken as a definite recitation of the structural characteristics of the component.

For the purposes of describing and defining the present invention it is noted that the term "substantially" is utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A microreactor assembly comprising a fluidic interconnect backbone and plurality of fluidic microstructures, wherein:
   each of the fluidic microstructures comprises a plurality of fluidic microchannels comprising respective microchannel input/output ports;
   the fluidic interconnect backbone comprises at least one interconnect microchannel comprising interconnect input/output ports;
   the microreactor assembly comprises a plurality of non-polymeric interconnect seals associated with the interconnect input and output ports;
   interconnect input/output ports of the fluidic interconnect backbone are interfaced with microchannel input/output ports of the fluidic microstructures at one of the non-polymeric interconnect seals; and
   the interconnect microchannel is defined entirely by the fluidic interconnect backbone and is configured such that it extends between the non-polymeric interconnect seals without interruption by additional sealed interfaces,
   wherein the non-polymeric interconnect seals comprise sintered glass portions of the fluidic interconnect backbone and the fluidic microstructures.

2. A microreactor assembly comprising a fluidic interconnect backbone and plurality of fluidic microstructures, wherein:
   each of the fluidic microstructures comprises a plurality of fluidic microchannels comprising respective microchannel input/output ports;
   the fluidic interconnect backbone comprises at least one interconnect microchannel comprising interconnect input/output ports;
   the microreactor assembly comprises a plurality of non-polymeric interconnect seals associated with the interconnect input and output ports;
   interconnect input/output ports of the fluidic interconnect backbone are interfaced with microchannel input/output ports of the fluidic microstructures at one of the non-polymeric interconnect seals; and
   the interconnect microchannel is defined entirely by the fluidic interconnect backbone and is configured such that it extends between the non-polymeric interconnect seals without interruption by additional sealed interfaces, wherein the non-polymeric interconnect seals comprise a layer of sintered glass particles interposed between adjacent glass portions of the fluidic interconnect backbone and the fluidic microstructures.

3. A microreactor assembly as claimed in claim 2 wherein the sintered glass particles exhibit a coefficient of thermal elongation that is compatible with the coefficient of thermal elongation of the adjacent glass portions of the fluidic interconnect backbone and the fluidic microstructures.

4. A microreactor assembly as claimed in claim 2 wherein the layer of sintered glass particles is derived from a paste comprising the sintered glass particles and a binder.

5. A microreactor assembly comprising a fluidic interconnect backbone and plurality of fluidic microstructures, wherein:

each of the fluidic microstructures comprises a plurality of fluidic microchannels comprising respective microchannel input/output ports;

the fluidic interconnect backbone comprises at least one interconnect microchannel comprising interconnect input/output ports;

the microreactor assembly comprises a plurality of non-polymeric interconnect seals associated with the interconnect input and output ports;

interconnect input/output ports of the fluidic interconnect backbone are interfaced with microchannel input/output ports of the fluidic microstructures at one of the non-polymeric interconnect seals; and the interconnect microchannel is defined entirely by the fluidic interconnect backbone and is configured such that it extends between the non-polymeric interconnect seals without interruption by additional sealed interfaces, wherein the non-polymeric interconnect seals comprise a sealed interface formed jointly by a glass portion of one of the fluidic microstructures, a glass portion of the fluidic interconnect backbone, and an intervening non-polymeric bonding material.

6. A microreactor assembly comprising a fluidic interconnect backbone and plurality of fluidic microstructures, wherein:

each of the fluidic microstructures comprises a plurality of fluidic microchannels comprising respective microchannel input/output ports;

the fluidic interconnect backbone comprises at least one interconnect microchannel comprising interconnect input/output ports;

the microreactor assembly comprises a plurality of non-polymeric interconnect seals associated with the interconnect input and output ports;

interconnect input/output ports of the fluidic interconnect backbone are interfaced with microchannel input/output ports of the fluidic microstructures at one of the non-polymeric interconnect seals; and the interconnect microchannel is defined entirely by the fluidic interconnect backbone and is configured such that it extends between the non-polymeric interconnect seals without interruption by additional sealed interfaces, wherein the non-polymeric interconnect seals comprise a sealed interface formed jointly by a glass or ceramic portion of one of the fluidic microstructures, a glass or ceramic portion of the fluidic interconnect backbone, and an intervening non-polymeric bonding material.

7. A microreactor assembly comprising a fluidic interconnect backbone and plurality of fluidic microstructures, wherein:

each of the fluidic microstructures comprises a plurality of fluidic microchannels comprising respective microchannel input/output ports;

the fluidic interconnect backbone comprises at least one interconnect microchannel comprising interconnect input/output ports;

the microreactor assembly comprises a plurality of non-polymeric interconnect seals associated with the interconnect input and output ports;

interconnect input/output ports of the fluidic interconnect backbone are interfaced with microchannel input/output ports of the fluidic microstructures at one of the non-polymeric interconnect seals; and the interconnect microchannel is defined entirely by the fluidic interconnect backbone and is configured such that it extends between the non-polymeric interconnect seals without interruption by additional sealed interfaces, wherein the non-polymeric interconnect seals comprises a glass/ceramic sealed interface formed from a glass portion of either the fluidic interconnect backbone or the fluidic microstructures and a ceramic portion of either the fluidic interconnect backbone or the fluidic microstructures.

8. A microreactor assembly comprising a fluidic interconnect backbone and plurality of fluidic microstructures, wherein:

each of the fluidic microstructures comprises a plurality of fluidic microchannels comprising respective microchannel input/output ports;

the fluidic interconnect backbone comprises at least one interconnect microchannel comprising interconnect input/output ports;

the microreactor assembly comprises a plurality of non-polymeric interconnect seals associated with the interconnect input and output ports;

interconnect input/output ports of the fluidic interconnect backbone are interfaced with microchannel input/output ports of the fluidic microstructures at one of the non-polymeric interconnect seals; and the interconnect microchannel is defined entirely by the fluidic interconnect backbone and is configured such that it extends between the non-polymeric interconnect seals without interruption by additional sealed interfaces, wherein the non-polymeric interconnect seals comprise a sealed interface formed jointly by a ceramic portion of one of the fluidic microstructures and a ceramic portion of the fluidic interconnect backbone.

9. A microreactor assembly comprising a fluidic interconnect backbone and plurality of fluidic microstructures, wherein:

each of the fluidic microstructures comprises a plurality of fluidic microchannels comprising respective microchannel input/output ports;

the fluidic interconnect backbone comprises at least one interconnect microchannel comprising interconnect input/output ports;

the microreactor assembly comprises a plurality of non-polymeric interconnect seals associated with the interconnect input and output ports;

interconnect input/output ports of the fluidic interconnect backbone are interfaced with microchannel input/output ports of the fluidic microstructures at one of the non-polymeric interconnect seals; and the interconnect microchannel is defined entirely by the fluidic interconnect backbone and is configured such that it extends between the non-polymeric interconnect seals without interruption by additional sealed interfaces, wherein the fluidic interconnect backbone and the plurality of fluidic microstructures are configured such that a selected plurality of the fluidic microstructures define a support plane along which the fluidic microstructures and the interconnect backbone of the microreactor assembly can be supported, and wherein:

the fluidic microstructures defining the support plane are positioned on one face of the interconnect backbone; and remaining fluidic microstructures of the microreactor assembly are positioned on another face of the interconnect backbone.

10. A microreactor assembly as claimed in claim 9 wherein:

the fluidic microstructures positioned on both faces of the interconnect backbone comprise respective microstructure configurations that represent a plurality of different manufacturing processes with a common sintering step; and the non-polymeric interconnect seals are configured to interface the interconnect input/output ports with corresponding microchannel input/output ports of the fluidic microstructures upon execution of the common sintering step, when the interconnect backbone and the fluidic microstructures are supported along the support plane defined by the selected plurality of the fluidic microstructures.

11. A method of fabricating a microreactor assembly comprising a fluidic interconnect backbone and plurality of fluidic microstructures, wherein each of the fluidic microstructures comprises a plurality of fluidic microchannels comprising respective microchannel input/output ports, the fluidic interconnect backbone comprises at least one interconnect microchannel comprises interconnect input/output ports, and the method comprises:

aligning the fluidic interconnect backbone and the fluidic microstructures by aligning the microchannel input/output ports with the interconnect input/output ports; and sintering the interconnect backbone and fluidic microstructure in the aligned state to form a plurality of non-polymeric interconnect seals associated with the interconnect input and output ports such that the interconnect input/output ports of the fluidic interconnect backbone are interfaced with microchannel input/output ports of the fluidic microstructures at one of the non-polymeric interconnect seals.

12. A method as claimed in claim 11 wherein the interconnect backbone and the fluidic microstructures are supported by a sintering support plate in a support plane defined a plurality of the fluidic microstructures during sintering.

13. A method as claimed in claim 12 wherein the interconnect backbone and the fluidic microstructures are supported by the sintering support plate in a state of assembly where components of the fluidic microstructures are in an un-sintered green state.

* * * * *